(No Model.)
T. H. BROWN.
ENDLESS SICKLE FOR REAPERS.
No. 492,322.  Patented Feb. 21, 1893.
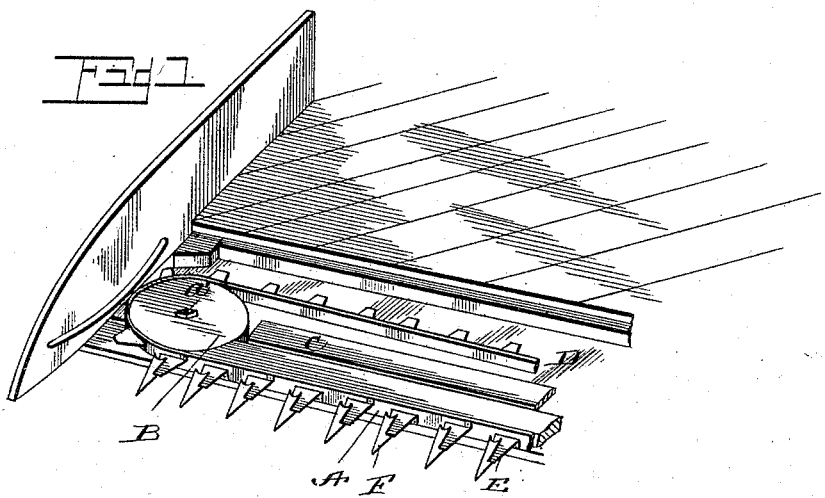
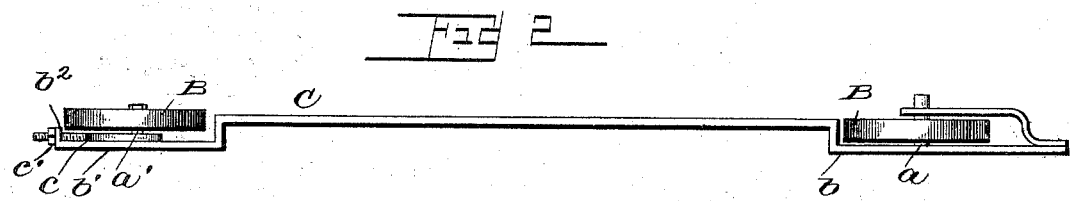
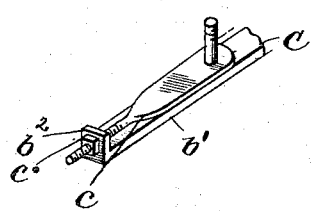
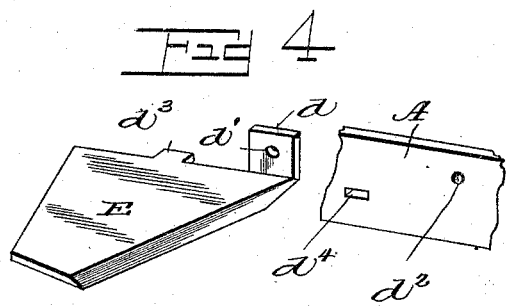
Witnesses
Inventor
Theodore H. Brown
By his Attorney
L. Deane

UNITED STATES PATENT OFFICE.

THEODORE H. BROWN, OF VIROQUA, WISCONSIN.

ENDLESS SICKLE FOR REAPERS.

SPECIFICATION forming part of Letters Patent No. 492,322, dated February 21, 1893.

Application filed February 26, 1892. Serial No. 422,893. (No model.)

*To all whom it may concern:*

Be it known that I, THEODORE H. BROWN, a subject of the Queen of Great Britain, but now residing at Viroqua, in the county of Vernon and State of Wisconsin, have invented certain new and useful Improvements in Endless Sickles for Reapers; and I do hereby declare the following to be a full, clear, and exact description of the invention, such as will enable others skilled in the art to which it appertains to make and use the same.

My invention relates to improvements in harvesters, more especially in the cutting apparatus therefor, and it has for its object to lessen the expenditure or application of driving power and, yet, secure a relative increase of speed, unattended by the objectionable jerking action experienced in the use of the ordinary and the endless sectional cutter bar, and securing an easier and perfect cutting action, reducing wear and tear and obviating clogging.

To these ends my invention consists in the employment of an endless band or belt, preferably of steel and encompassing pulleys and carrying cutters or knives, after the fashion of the common cutter-bar; and in certain details of construction of the parts, all substantially as hereinafter more fully disclosed and pointed out in the claims.

In the accompanying drawings: Figure 1, is a broken perspective view of a portion of a harvester embodying my invention. Fig. 2, is a detailed edge view of the support or bracket for the pulleys bearing the knife or cutter belt or band, said pulleys also being shown. Fig. 3, is a detailed perspective view of the pulley and belt tension device and Fig. 4, is also a detailed perspective view of one of the cutters or knives and a broken away portion or section of the belt or band.

In the embodiment of my invention I employ an endless belt or band A, preferably of steel and having a continuous unbroken plain surface and adapted to encompass plain-faced pulleys B B, suitably mounted or journaled, one, upon a shaft or journal $a$, and the other upon a shaft $a'$.

C, is a bracket of wrought iron or steel arranged and suitably secured at the front end of the gavel platform D, and preferably offset at its ends, as at $b\ b'$, one offset $b$, having bolted or secured thereto in its bottom one journal or shaft $a$, also suitably braced in position and upon the other offset $b'$, is supported a plate $c$, bearing the other journal or shaft $a'$, at one end. The bearing or plate $c$, has its other end-portion screw-threaded and adapted to pass through a slightly larger aperture in a turned-up end-portion $b^2$, of the offset $b'$, of the bracket C, and provided with an adjusting nut $c'$, outside of said end-portion $b^2$, to provide for taking up slack or regulating the tension of the endless belt or band A. The belt or band A, is armed, at short intervals throughout, with knives or cutters E, for cutting the grain or grass, each having at its right hand, or one, inner corner a turned-up edge portion or flange $d$, adapted to be bolted to the band or belt by the passage of a bolt through coincident holes $d', d^2$, provided in said flange and the belt or band, respectively. This bolt may have its head countersunk in the band A, or may have screw threads to engage corresponding screw threads in the aperture therein, its head lying against the flange $d$. Or the bolt may be formed with a very flat thin head so as not to materially interfere with the passage of the belt over the pulleys. As the material of which the belt is made is quite thin, there will be a liability of the bolts pulling out under the strain on the cutters and in order to make the belt last as long as possible, I arrange the flanges on the alternate cutters on opposite sides thereof, namely top and bottom, whereby the strain on the band is equalized. By this arrangement, it will be seen that should one of the cutters pull out of the band, it may be replaced by another having the flange formed on the opposite side. Again, by arranging the edge of the cutter which is secured to the band in advance of the projection it will be seen that a much stronger construction results than would be had were the cutter secured at its rear edge only, and a much cheaper construction than could be had by securing it at both edges to the band. Each cutter or knife E, has also at its inner edge, about equidistant from its flange $b^2$, and its left hand corner, a stud or projection $d^3$, adapted to enter a corresponding aperture $d^4$, in the band or belt A, thus aiding the retention of the knife in a horizontal position.

The knives or cutters are adapted to travel through fingers or guards F, suitably fastened to the front edge of the gavel platform.

Motion is communicated to either of the pulleys in any well known way to effect the driving of the endless band or belt, with its knives or cutters and it is obvious that, by reason of the unbroken or continuous plain surface of the belt or band and the like surfaces of the pulleys, less driving power will be expended, and, relative increase of speed will be secured, without the attendant objectionable jerking action of the ordinary and the endless sectional cutter bar, while an easier and perfect cutting action are obtained, and clogging is obviated. My cutting apparatus, it is also obvious, is capable of general or universal application, being readily adapted to all harvesters.

I now claim—

1. The cutting apparatus for harvesters comprising an endless belt or band having a longitudinal row or series of perforations therein, means for carrying said belt, and a series of cutters having projections adapted to engage the perforations in the belt, and means for securing said cutters to the belt, substantially as set forth.

2. The cutting apparatus for harvesters, comprising an endless belt or band having a series of perforations and means for carrying the same, and a series of cutters secured to said belt at their forward ends and having projections engaging the perforations in said belt, substantially as set forth.

3. The cutting apparatus for harvesters comprising the endless band or belt and means for carrying the same said band or belt having the knives or cutters, each having an upturned portion or flange secured to said belt and equidistant, about, of said flange and its opposite edge, a projection adapted to be connected to said band or belt, substantially as specified.

4. The cutting apparatus for harvesters, comprising the endless steel band or belt and its carrying pulleys and cutters or knives each having a projection and a flange, the former entering an aperture in said band or belt and the latter having bolt connection therewith, substantially as set forth.

5. The cutting apparatus for harvesters, comprising an endless belt or band, and means for carrying the same, and a series of cutters each having a flange secured to said belt the flanges on alternate cutters being arranged at top and bottom respectively.

In testimony whereof I affix my signature in presence of two witnesses.

THEODORE H. BROWN.

Witnesses:
  C. W. GRAVES,
  ROBT. B. MCCOY.